United States Patent [19]

Rhein-Knudsen et al.

[11] Patent Number: 5,250,806

[45] Date of Patent: Oct. 5, 1993

[54] STAND-OFF COMPENSATED FORMATION MEASUREMENTS APPARATUS AND METHOD

[75] Inventors: Erik Rhein-Knudsen; Michael Evans, both of Missouri City; Jacques M. Holenka, Houston, all of Tex.

[73] Assignee: Schlumberger Technology Corporation, Houston, Tex.

[21] Appl. No.: 670,819

[22] Filed: Mar. 18, 1991

[51] Int. Cl.$^5$ .......................... G01N 5/10; G01N 5/14
[52] U.S. Cl. .................................. 250/254; 250/265; 250/266; 250/269
[58] Field of Search ............... 250/254, 264, 265, 266, 250/268, 269, 270

[56] References Cited

U.S. PATENT DOCUMENTS

| | | |
|---|---|---|
| 3,255,353 | 6/1966 | Scherbatskoy . |
| 4,596,926 | 6/1986 | Coope ................................. 250/265 |
| 4,698,501 | 10/1987 | Paske ................................. 250/265 |
| 4,705,944 | 11/1987 | Coope ................................. 250/254 |
| 4,829,176 | 5/1989 | Paske et al. ........................ 250/254 |
| 4,879,463 | 11/1989 | Wraight et al. .................... 250/270 |
| 4,904,865 | 2/1990 | Meisner et al. .................... 250/254 |
| 4,972,082 | 11/1990 | Loomis et al. ..................... 250/269 |
| 5,017,778 | 5/1991 | Wraight ............................. 250/254 |
| 5,091,644 | 2/1992 | Minette .............................. 250/254 |
| 5,130,950 | 7/1992 | Orban et al. ....................... 367/35 |

OTHER PUBLICATIONS

Gartner, "Neutron Porosity Measurement While Drilling", Gearhart Industries, Inc., Austin, Tex., undated.
"MWD Formation Evalution", trade brochure, Gearhart Geodata Services, Houston, Tex. 1988.
"Design and Applications of the Modular Neutron Porosity Tool", Teleco Oilfield Services, Inc., 1990.
Coopersmith, C. A., & Barnett, W. C., "Environmental Parameters Affecting Neutron Porosity, Gamma Ray, and Resistivity Measurements While Drilling" SPE paper 16758, presented at the 62nd annual Technical Conference of the Society of Petroleum Engineers, Dallas, Tex., Sep. 27-30, 1987.
Paske, W. C., Roesler, R. F., Barnett, W. C., & Rodney, P. F., "Formation Density Logging While Drilling", SPE paper 16756, presented at the 62nd annual Technical Conference of the Society of Petroleum Engineers, Dallas, Tex., Sep. 27-30, 1987.
Roesler, R. F., Barnett, W. C. & Paske, W. C., "Theory and Application of a Measurement-While-Drilling Neutron Porosity Sensor", SPE/IADC paper 16057, presented at 1987 SPE/IADC Drilling Conference, New Orleans, La., Mar. 15-18, 1987.

*Primary Examiner*—Carolyn E. Fields
*Attorney, Agent, or Firm*—Gary L. Bush; John J. Ryberg; Wayne I. Kanak

[57] ABSTRACT

Apparatus and method for measuring density, porosity and other formation characteristics while drilling is disclosed. The apparatus, preferably housed in a drill collar and placed within a drill string, includes a source of neutrons and a source of gamma rays placed within a tubular body which is adapted to provide for the flow of drilling through it. Two sets of stabilizer blades are provided. One set, associated with the neutron source, includes secondary radiation detectors that are placed radially beyond the nominal outer radius of the body. Formation porosity measurement accuracy is substantially enhanced since the standoff of the detectors from the formation is substantially decreased. Another set, associated with the gamma ray source, includes one or more gamma ray detection assemblies in a single blade. Each of the gamma ray detector assemblies is also placed radially beyond the nominal outer radius of the tubular wall. Formation density or absorption coefficient accuracy is substantially enhanced since the standoff between the detection assembly and the borehole wall is decreased. In a particularly preferred embodiment, ultrasonic sensors incorporated either or both sets of blades provide a measurement of the borehole diameter and/or standoff of the detectors from the borehole. The bulk density measurement and neutron porosity measurement data can be corrected with information derived from the standoff or borehole diameter.

18 Claims, 4 Drawing Sheets

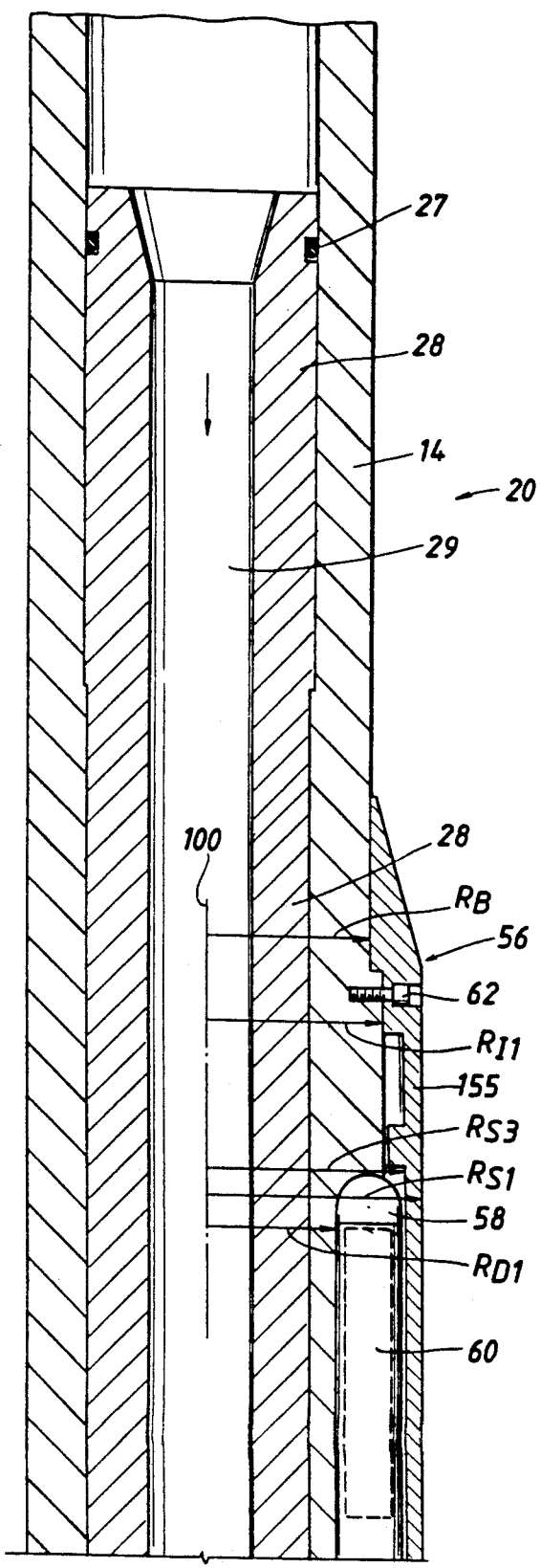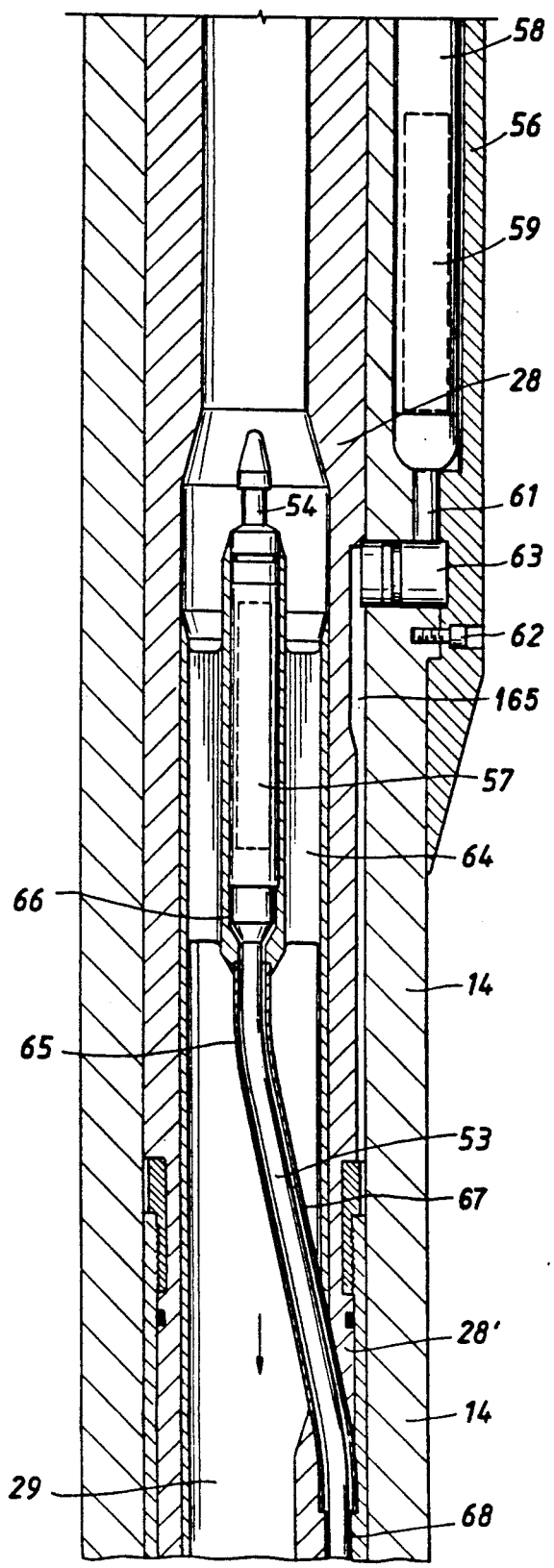
FIG.5A
FIG.5B

STAND-OFF COMPENSATED FORMATION MEASUREMENTS APPARATUS AND METHOD

TECHNICAL FIELD

This invention relates generally to devices and methods for measuring earth formation properties such as porosity, density and photoelectric absorption coefficient. The invention is preferably embodied in a drilling collar such that these measurements may be made while drilling. Still more particularly, the invention relates to a method and apparatus by which neutron porosity and gamma-gamma density measurement data can be collected with increased accuracy by decreasing detector-borehole standoff, and through measurement and determination of detector standoff, the compensation of such measurement data as a function of such standoff.

BACKGROUND OF THE INVENTION

A measuring while drilling apparatus for making porosity, density and other formation characteristic measurements is described in U.S. Pat. No. 4,879,463 issued Nov. 7, 1989 and assigned to the assignee of the present invention. The patent describes a drilling collar in which two radioactive sources are provided. A neutron source is positioned near the cylindrical axis of the tool while a gamma ray source is eccentered against an interior side of the collar's cylindrical body. Both sources can be axially inserted into and removed from the body's interior via one end of the body. Secondary radiation detectors for the porosity measurement are provided within an interior cylindrical body secured within the collar cylindrical body. Similarly, gamma radiation detectors are arranged within the interior body.

Stabilizer blades provided about the outer radius of the cylindrical tool aid in the drilling process. Openings in a blade angularly aligned with the gamma radiation detectors are aligned with openings in the steel cylindrical body which are also aligned with the detectors. Radiation transparent materials are provided in the openings of the steel body and the adjacent stabilizer blade.

The apparatus described above represents significant advances in the field of performing porosity and neutron measurements of surrounding formations while drilling a borehole. First, the nuclear sources are placed within the body of the collar on a retrievable carrier which is loaded into the collar from its end. When inserted, the gamma ray source automatically is properly placed in an eccentered position in the collar; the neutron source is placed on the center-line of the collar. Advantageously, if the drill collar were to become stuck in the hole, a fishing head placed at the top of the carrier may be latched by means of fishing equipment such as a wireline-conveyed overshot through the center or mud flow path of the drill string. The carrier with both nuclear sources may then be brought to the surface.

Performing porosity measurements and density measurements while drilling results in certain advantages over conventional wireline porosity and density measurements. Longer sample periods due to the slower nature of the drilling process reduce the statistical variations and uncertainty in measuring while drilling porosity and density measurements. Many of the borehole effects that perturb wireline measurements of porosity or density are reduced because the drill collar substantially fills the borehole while drilling. Also, formation effects, lithology and salinity changes under drilling conditions are comparable to or less than those for an open hole wireline measurement which may occur hours or even days after the borehole is drilled. However, the washing action of drilling fluid while drilling can produce variations in borehole size. Increased variations in borehole diameter are called washouts. Separation, or "standoff", of the tool from the borehole wall causes measured data perturbations. The occurrence of washouts exacerbates the standoff effect.

The apparatus of U.S. Pat. No. 4,879,463 described above performs well under ordinary drilling conditions. For example, where an eight and one half inch (8½") drill bit is used, a six and one half inch (6½") drill collar is used above it. With the detectors within the collar cylindrical body, approximately a one inch standoff exists between the tool and the borehole wall. However, where larger size holes are drilled, for example with a twelve and one-quarter inch (12¼") drill bit, an eight inch (8") drill collar is typically used above it. The combination of such a 12¼" bit and an 8" collar results in a nominal two inch standoff between the tool and the borehole wall. Such large standoffs are disadvantageous as explained above.

One measuring while drilling assembly is schematically illustrated in an advertisement brochure of Gearhart Geodata Services. As best can be understood from the schematic illustrations, a radiation source and near and far detectors are placed in one of four stabilizer fins of a cylindrical body of a MWD porosity tool. Except for the diameter of the device, its physical characteristics appear to be essentially the same as a conventional wireline compensated neutron porosity tool in that a conventional compensated neutron porosity tool is designed to be run eccentered in the borehole. In other words, a single source, near detector, and far detector eccentered alignment appears to be contemplated in the proposed Gearhart Geodata Services device with a stabilizer blade serving as the mechanism for providing eccentering of the source and detectors.

A similar measurement while drilling neutron porosity tool is described in a brochure of TELECO OILFIELD SERVICES, INC. bearing a copyright notice of 1990 with a further notation of May 1990. The brochure describes a similar drill collar with a source and a single pair of near and far detectors aligned with the source. The tool includes a 6¾" diameter mandrel with a 7½" upset. Three fluted channels located in the upset allow for return mud circulation. The source and detectors are aligned with one of the three resulting "vanes" but apparently are not placed radially beyond the nominal 6¾" diameter.

OBJECTS OF THE INVENTION

A general object of the present invention is to extend radially the position of radioactivity sensors in a logging while drilling tool where the nominal standoff of the cylindrical body of the tool and the borehole wall is relatively large.

Another object of this invention is to place both ultrasonic sensors and radiation detectors radially beyond a nominal cylindrical body radius of a logging while drilling tool in order to enhance the measurement of tool standoff and formation characteristics by reducing the distance between sensors and detectors and the formation wall.

It is an object of this invention to provide a neutron porosity while drilling tool with a plurality of symmetrically azimuthally placed secondary radiation detectors extending beyond the nominal outer radius of the tool and partially into stabilizer blades to enhance porosity data acquisition accuracy.

It is another object of this invention to provide a neutron porosity while logging tool with ultrasonic sensors for measuring the diameter of the borehole and thereby providing a correction to the neutron porosity measurement.

Another object of the invention is to provide a gamma-gamma density while drilling tool with near and far gamma ray detectors extending beyond the nominal outer radius of the tool and partially into a stabilizer blade azimuthally aligned with an eccentered gamma ray source to enhance density data acquisition accuracy.

Another object of the invention is to provide a gamma-gamma density while drilling tool with ultrasonic sensors for the measurement of standoff between the tool and the borehole wall.

Another object of the invention is to provide a measuring while drilling tool with neutron porosity measuring apparatus, gamma-gamma density measuring apparatus, and ultrasonic caliper/standoff measuring apparatus.

Another object of the invention is to provide a measuring while drilling tool with detachable stabilizer blade covers which facilitate placement in and removal of radiation detectors and also changing the size of the stabilizers.

SUMMARY OF THE INVENTION

The objects identified above along with other advantages and features of the invention are achieved with a logging-while-drilling (LWD) apparatus such as a drill collar equipped with porosity, density or photoelectric absorption coefficient, and standoff measurement sensors. The porosity radioactivity detectors are placed at least partially outwardly of the tubular body of the collar within stabilizer blades. Such placement results in the detectors being relatively closer to the borehole wall and decreases the measurement error of collected data caused by borehole fluid and formation cuttings which exist in the standoff space between blade and borehole wall.

The density or absorption coefficient gamma ray sensors are placed outwardly of the tubular body of the collar within one blade of an additional set of stabilizer blades. Such placement decreases the measurement error of collected data caused by gamma rays travelling through the standoff between the tool and the formation.

In order to further increase the ultimate accuracy of the determination of formation porosity and formation density or photoelectric absorption coefficient, ultrasonic sensors are placed on stabilizer blades to collect acoustic data useful in determining tool standoff and borehole diameter. Such acoustic data and radioactivity data as a function of borehole depth are transmitted to surface instrumentation for correction of porosity and/or density or absorption coefficient data as a function of tool standoff. Alternatively, the borehole diameter and tool standoff corrections to the porosity and density data, respectively, are performed downhole and the corrected data transmitted to the surface in real time, or stored in downhole memory for later retrieval and playback.

BRIEF DESCRIPTION OF THE DRAWINGS

The objects, advantages and features of the invention will become more apparent by reference to the drawings which are appended hereto and wherein like numerals indicate like parts and wherein an illustrative embodiment of the invention is shown, of which:

FIGS. 5A, 5B, 6A and 6B illustrate with more detail the arrangement of sources, detectors, stabilizer fins etc., of the measuring while drilling tool of the invention.

DESCRIPTION OF THE INVENTION

Figure 1:
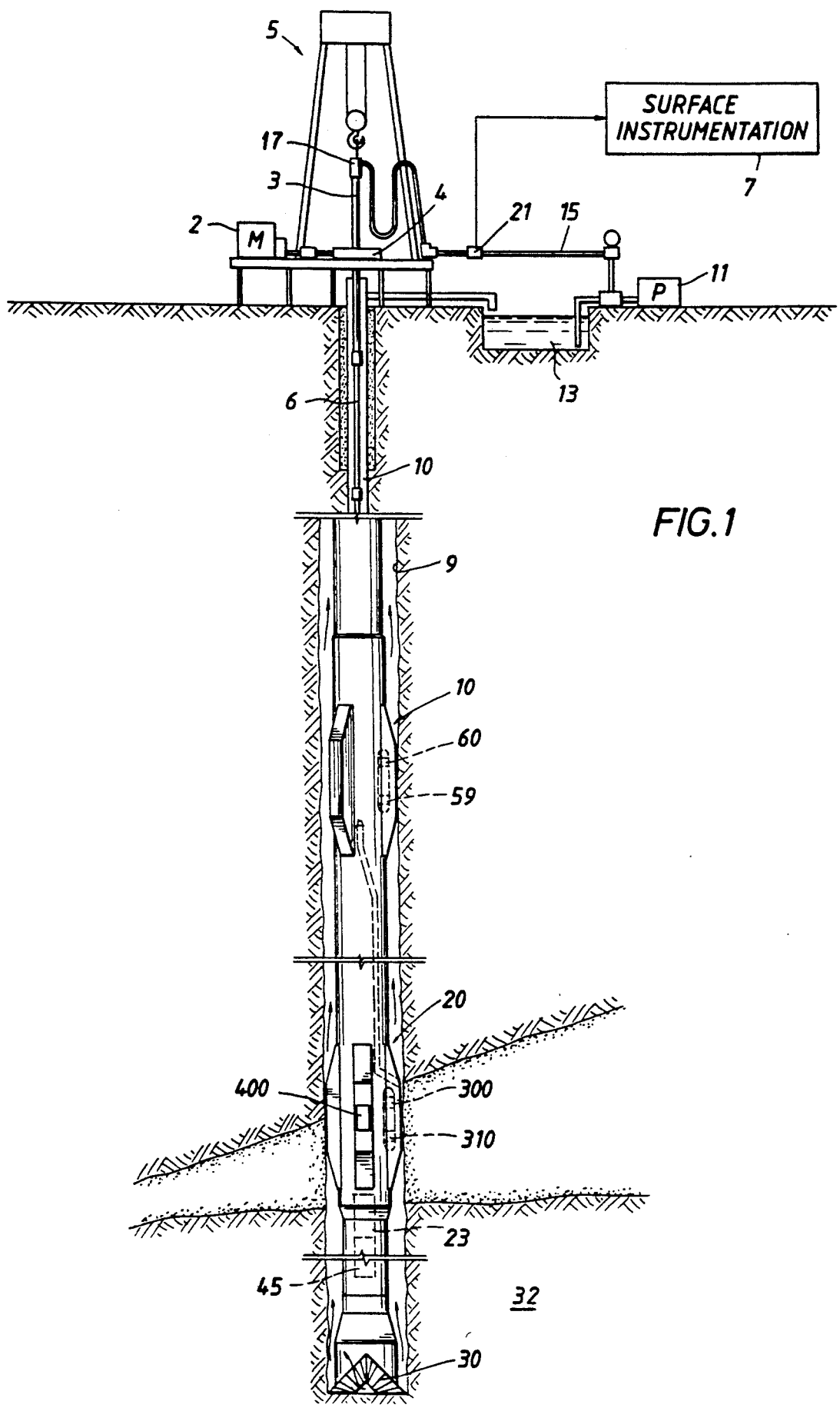
FIG. 1 schematically illustrates a measuring while drilling tool placed in a drill string, where the tool measures neutron porosity and formation density or photoelectric absorption coefficient, and preferably simultaneously measures borehole diameter or tool standoff for correcting the measured neutron porosity and/or density or photoelectric absorption coefficient.

FIG. 1 illustrates a typical rotary drilling rig system 5 having apparatus for measurement while drilling of formation porosity, formation bulk density, formation photoelectric absorption coefficient, and borehole diameter associated therewith. Downhole measurements are conducted by instruments placed in drill collar 20. Such measurements may be stored in memory apparatus of the downhole instruments, or may be telemetered to the surface via conventional measuring-while-drilling telemetering apparatus and methods. For that purpose, an MWD tool sub, schematically illustrated as data signaling module 23, receives signals from instruments of collar 20, and telemeters them via the mud path of drill string 6 and ultimately to surface instrumentation 7 via a pressure sensor 21 in stand pipe 15.

Drilling rig 5 includes a motor 2 which turns a kelly 3 by means of a rotary table 4. A drill string 6 includes sections of drill pipe connected end-to-end to the kelly and turned thereby. A drill collar 20 of this invention, as well as other conventional collars and other MWD tools, are attached to the drilling string 6. Such collars and tools form a bottom hole drilling assembly between the drill string 6 and the drilling bit 30.

As the drill string 6 and the bottom hole assembly turn, the drill bit 30 bores the borehole 9 through earth formations 32. An annulus 10 is defined as the portion of the borehole 9 between the outside of the drill string 6 including the bottom hole assembly and the earth formations 32.

Drilling fluid or "mud" is forced by pump 11 from mud pit 13 via stand pipe 15 and revolving injector head 17 through the hollow center of kelly 3 and drill string 6 to the bit 30. The mud acts to lubricate drill bit 30 and to carry borehole cuttings upwardly to the surface via annulus 10. The mud is delivered to mud pit 13 where it is separated from borehole cuttings and the like, degassed, and returned for application again to the drill string.

The preferred embodiment of the invention is incorporated in a drill collar 20 which is an important component of an improved MWD nuclear logging system from that disclosed in U.S. Pat. No. 4,879,463 described above, which is hereby incorporated herein by reference. As shown in more detail in FIG. 2 through FIG. 6B, the drill collar 20 includes porosity measurement section 500 at the upper end of the collar and a gamma-gamma density section 600 at the lower end.

Figure 2:
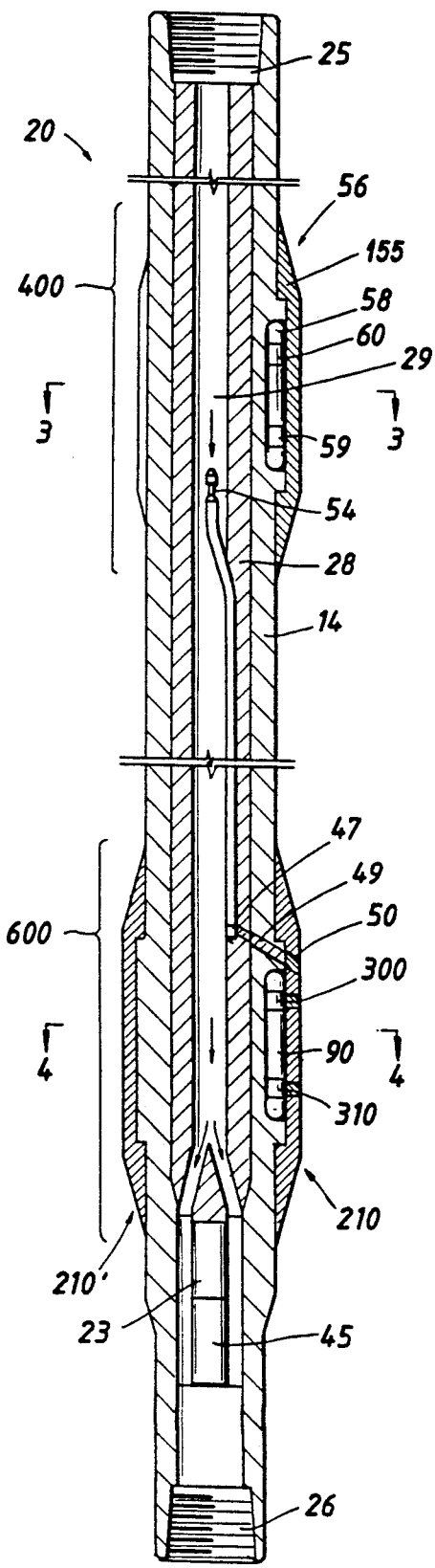
FIG. 2 is a longitudinal cross-section through the measuring while drilling tool illustrating an upper neutron source and detectors and lower gamma ray source and detection assemblies and ultrasonic standoff measurement sensors.

Referring now to FIG. 2, the collar or "tool" 20 ("tool" and "collar" are used interchangeably herein) includes a generally tubular outer body 14 preferably including upper threads 25 and lower threads 26 by which it is connected to other collars, subs, drill pipe, etc., in drill string 6. Tubular body 14 has a nominal outer radius (or diameter) which is generally a constant dimension as a function of its longitudinal or axial length, except at portions of the neutron porosity section 500 and gamma density section 600 where stabilizer blades are provided.

An inner body 28 is secured and fluidly sealed within outer body 14. O-ring seals 27 illustrated at FIG. 5A seal the inner body 28 with the outer body 14. Other seals (not shown) at the bottom of the tool provide additional sealing. A mud flow path 29 is provided within inner body 28 that is sized for carrying drilling fluid from the drill string 6 to bit 30. As illustrated best in FIG. 2, mud path 29 enters the top of the tool 20 coaxially within inner body 28, extends around fishing neck 54, continues about coaxially positioned data signalling cartridge 23 and electronic cartridge 45, and exits coaxially via the bottom end of the tool.

Figure 6A:
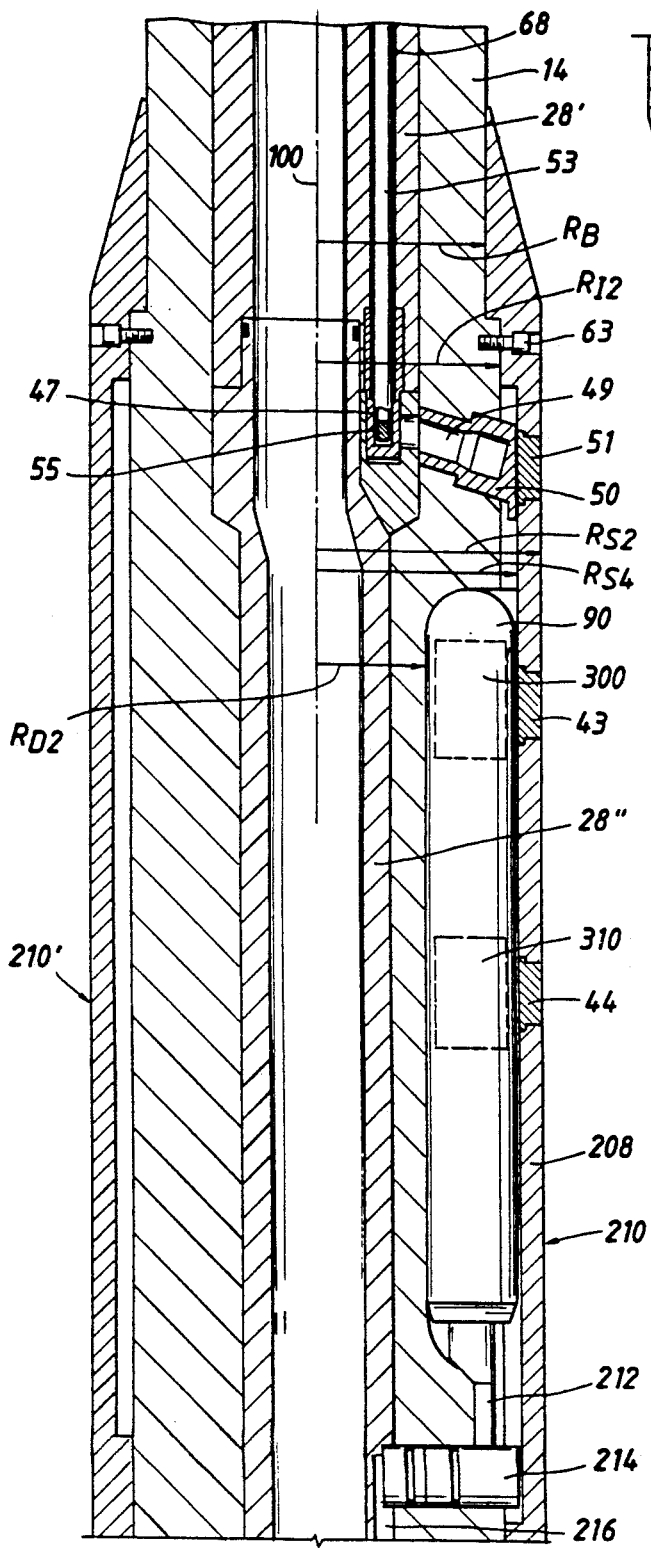
Figure 6B:
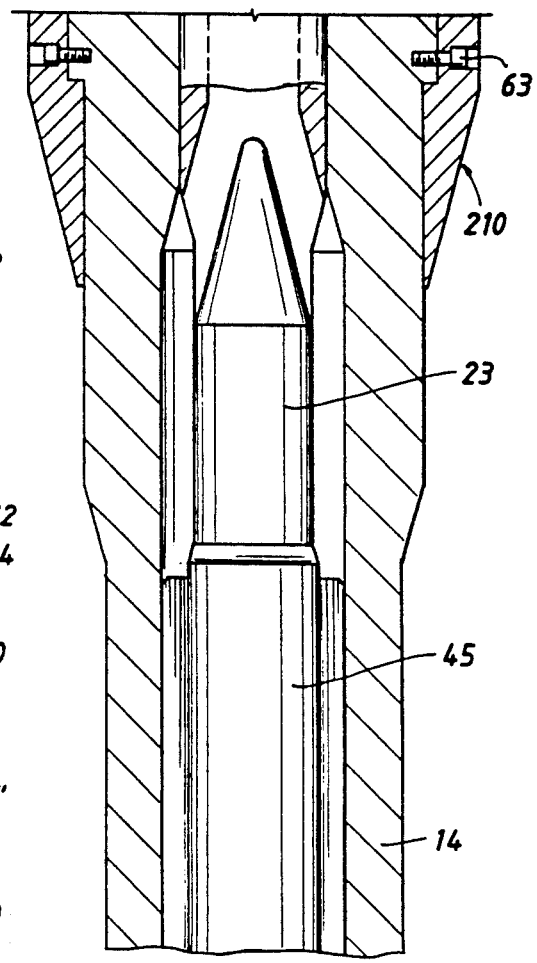

The preferred structure and design for placing a neutron radiation source 57 (see FIG. 5B) in neutron porosity section 500 and a gamma radiation source 55 in gamma-gamma density section 600 (see FIG. 6A) is substantially the same as that described in the above mentioned U.S. Pat. No. 4,879,463. As best illustrated in FIGS. 5B and 6A, the neutron source 57 is mounted at the upper end of an elongated flexible carrier 53. The gamma ray source 55 is secured to the lower end of carrier 53. Retrievable carrier 53 is preferably a relatively stiff, yet flexible, solid rod which can be inserted through passage 29 at the top of tool 20, or withdrawn. However, other types of source location and placement designs may also be used in practicing the present invention including those tools where the sources are placed in pockets or chambers accessible from the exterior of the tool. Retrievable carrier 53 is described in more detail in commonly-assigned U.S. patent application Ser. No. 07/670,850 filed concurrently herewith and hereby incorporated herein by reference.

To correctly position the radiation sources 55 and 57 in the longitudinal bore 29 in the preferred embodiment of the present invention, a centralizing member 64 is disposed in the inner body 28. Member 64 includes a central passage 66 with an upper axially-aligned portion cooperatively arranged for centering the upper end portion of the retrievable carrier 53 in the tubular outer body 14. An extension 65 of the central passage 66 is further arranged with a lower downwardly-inclined portion 67 that diverts the intermediate portion of the retrievable carrier 53 to the side of the inner body 28' so that the lower portion of the retrievable carrier 53 can be loosely retained with a laterally-offset longitudinal passage 68 that extends along one side of the inner body 28'.

Passage 68 is aligned with the source chamber 47 in the inner body 28'. Accordingly, it will be seen from FIGS. 5B and 6A that the two interconnected passages 66 and 68 cooperate to correctly position the sources 55 and 57 in the body 14, by virtue of the flexibility of the carrier 53 and the curvatures of the transitional portions of the two passages. The retrievable carrier 53, including neutron source 57 and gamma ray source 55, can be readily inserted into and removed from the tool body. Should tool 20 of the present invention become stuck in the borehole, the removal of the radiation sources 55 and 57 can be accomplished by lowering a suitable wireline-conveyed or tubing-conveyed overshot (not shown) through the drill string 6 and into the upper end of the body 14 until the overshot is securely coupled to the upstanding fishing neck 54. Removal of the lower and upper sources 55 and 58 may be carried out without disconnecting any electrical connections. Advantageously, even though the removal of the sources 55 and 57 will render the radioactivity measurement capability of the tool 20 thereafter inoperative, the tool 20 will still be functional so that it can continue to provide the other downhole measurements that are independent of either of the radiation sources 55 and 58. So long as the radiation sources 55 and 57 are positioned within the tool 20 of the invention, they will be operative to provide radiation to produce successive data signals representative of the formation density and porosity of the earth formations 32 that have been penetrated by the drill bit 30. Detection of such signals is described below with an explanation of the placement of detectors to generate such signals and the correction of such signals with measurement of borehole diameter and tool standoff.

The preferred coaxial placement of neutron source 57 is advantageous over prior eccentering of such source, as is typical in wireline logging tools. As explained in U.S. Pat. No. 4,879,463, coaxial placement of neutron source 57 allows a larger sized source to be used with corresponding greater radiation output strength. An americium-beryllium "chemical" neutron source is preferred, but alternatively, an electronic neutron generator of a type well known in the wireline logging industry, if properly ruggedized, would offer advantages of electronic shut-off of neutron radiation.

The gamma-ray radiation source 55 secured to the bottom end of retrievable carrier 53 is preferably an encapsulated chemical source such as a quantity of cobalt or cesium or other suitable radioactive substance that produces gamma rays in its decay. Radiation chamber 47, in which source 55 is placed when carrier 53 is fully inserted within tool 20, is angularly arranged within inner body member 28' so as to be angularly and longitudinally aligned with opening 49 in body 14. As will be explained more fully below, "gamma radiation" stabilizer blade 208 is angularly aligned with opening 49.

The opening 49 is fluidly sealed by a radiation-transparent member 50. A plug or window 51 in stabilizer blade 208 is placed in a hole in blade 208 which is aligned with opening 49 of body 14. Such plug is fabricated with a radiation transparent material such as beryllium, nitrile rubber, or titanium for excluding mudcake or other borehole materials.

The measuring-while-drilling tool or collar 20 exhibits many features not found in the tool of U.S. Pat. No. 4,879,463 and other prior radiation type measuringwhile-drilling tools. A first feature relates to the placement of secondary radiation detectors 59 and 60 radially beyond the nominal body radius $R_B$ of body wall 14. Near radiation detector 59 and far radiation detector 60 may comprise parallel connected helium 3 detectors, which are directly responsive to neutrons, or parallel connected Geiger-Mueller tubes, which are sensitive to gamma rays produced by the interaction between neutrons and the formation nuclei. In order to reduce the effect of borehole materials, (such as drilling fluid, cuttings, etc.) on the radiation transmitted through and returning from the surrounding formation to the detector, the near and far detectors 59, 60 are placed in cavities 58 which are radially provided at least partially in the associated stabilization blades 56.

Figure 3:
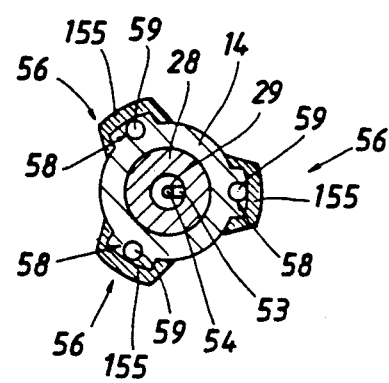
FIG. 3 is a cross-section of the tool of FIG. 2 looking downwardly along lines 3—3.

FIGS. 5A, 5B and 3 illustrate the orientation of cavities 58 in which near detectors 59 and far detectors 60 are placed. FIG. 3, a cross-section along lines 3—3 of FIG. 2, shows that stabilizer blades 56 are preferably constructed by providing three symmetrically increased diameter or radius sections of body 14. Such section of increased radius of body 14 is illustrated with a radius arrow $R_{J1}$ (representing radius of first increased dimension). Each increased radius section is defined by an angular width, as seen in FIG. 3, and a longitudinal or axial length as illustrated in FIGS. 5A and 5B. Over a substantial portion of each increased radius portion, a reduced radius outwardly facing slot is formed of minimum radius $R_{D1}$ (for first decreased radius). An external cover 155, which is secured to increased diameter bases by a plurality of upper and lower threaded bolts 62, is wider in angular extent and longer in longitudinal length, as illustrated in FIGS. 2, 3, 5A and 5B, than is each increased diameter base. An inwardly facing slot within each cover 155 is substantially aligned with a corresponding slot in the increased radius section to create detector spaces or cavities 58. Radiation near-detectors 59 and radiation far-detectors 60 are secured within cavities 58 in the positions illustrated by suitable securing means. Although it is preferred to create the stabilizer blades 56 as illustrated in a "sandwiched" form, such blades 56 may be integral with body 14, or covers 155 may be constructed to slide on increased radius sections of body 14.

Longitudinal slot 61 extends downwardly from each cavity 58 to lateral slot 63. A channel 165 is provided at lateral slot 63 downwardly between inner body 28 and outer body 14. The channel 165, lateral slot 63, and longitudinal slot 61 provide a cable path for electrical leads connected to detectors 59 and 60. Such cable path leads downwardly to electronic cartridge 45 via other passages (not illustrated).

The blades 56 may be changed at a well site by providing covers 155 of different radial sizes. For example, stabilizer blades 56 be made "full gauge" for straight drilling or be made "under gauge" for deviated drilling by providing "full gauge" covers 155 or "under gauge" covers 155.

Figure 4:
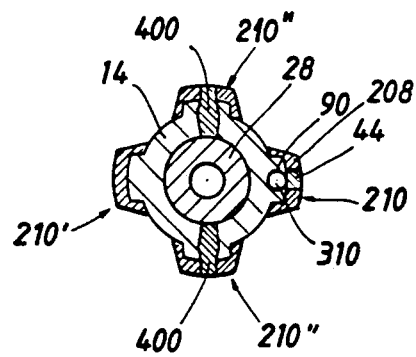
FIG. 4 is a cross-section of the tool of FIG. 2 looking downwardly along lines 4—4.

The measuring-while-drilling tool or collar 20 further exhibits features not found in tool of U.S. Pat. No. 4,879,463 in that near and far gamma ray detectors are placed at least partially radially beyond the nominal outer radius $R_B$ of body wall 14. In a similar construction as described for the stabilizer blades, cavities, etc for the neutron detectors 59 and 60, an increased radius $R_{J2}$ of an angular width and longitudinal length (as shown in FIGS. 4 and 6A) is provided in the lower part of body wall 14. An outwardly facing slot of reduced radius $R_{D2}$ is formed in the increased radius section. A cover 208 is sandwiched over the increased radius wall section and extends beyond the longitudinal ends of the increased radius section and extends beyond the angular width of the increased radius section. Such cover 208 is preferably secured to the lower increased radius sections by a plurality of upper and lower threaded bolts 63. An inwardly facing slot in cover 208 cooperates with the outwardly facing slot of reduced radius $R_{D2}$ of wall body 14 to create cavity 90 in stabilizer blade 210. A corresponding blade 210' is provided of similar construction as shown at FIGS. 2, 4, 6A and 6B but does not include a cavity for placement of detectors. The stabilizer blades 210, 210' and 210" may, like blades 56 described above, be changed at the well site by providing covers of different radial sizes.

Near gamma ray detector 300 and far gamma ray detector 310 are secured within cavity 90 by conventional securing means. Near and far gamma ray detectors each preferably comprise an inorganic scintillator coupled to a photomultiplier. A suitable scintillation detector may be provided of sodium iodide. Plugs 43 and 44, which are preferably made of material substantially transparent to gamma radiation, fill holes in cover 208 adjacent the scintillators of detectors 300, 310. Beryllium, nitrile rubber, or titanium are the preferred materials for such plugs.

Longitudinal slot 212 opens into radial slot 214 which in turn leads to a space 216. Space 216 communicates with a cable path leading to electronic cartridge 45. A cable including electric leads (not shown) runs from electronic cartridge 45 to detectors 300 and 310.

The measuring-while-drilling apparatus of a particularly preferred embodiment of this invention includes additional sensors to those described in U.S. Pat. No. 4,879,463. Ultrasonic sensors 400 (see FIGS. 1 and 4) are preferably placed in collar 20 in the lower part of body at the same general level as the gamma-gamma density section 600 of the tool. The construction and placement in opposing blades 210" is generally described in commonly-assigned U.S. patent application Ser. No. 07/525,268, filed on May 16, 1990, now U.S. Pat. No. 5,130,950, which is incorporated herein by reference as if its specification were written here.

Briefly, the ultrasonic sensors 400 of tool 20 are preferably transceivers which emit high frequency acoustic or "sonic" pulses and receive echoes from the borehole wall. Transceivers 400 provide a tool standoff measurement to determine the hole diameter when the tool is rotating (which is the normal case during drilling), or when the tool is stationary. When the tool is rotating, the transceiver sends the sonic pulse through the mud-filled gap or annulus between the tool and borehole wall. The gap typically varies with the rotation angle. The measured standoffs are accumulated for statistical processing, and the average hole diameter is calculated after several turns. Several standoff measurements are preferably evaluated each second. Because the typical drill string rotation speed is between about 50 to 200 RPM, an average accumulation time from about 10 to about 60 seconds creates enough data for accurate averaging.

Providing a second transceiver diametrically opposed from the first improves the diameter measurement when the tool axis moves from side to side in the well-bore during drilling. One transceiver measures the standoff on its side. Then immediately thereafter or simultaneously, the other transceiver measures the standoff on the other side of the tool. Simultaneous firing of diametrically opposed transceivers is of course possible but not preferred in that more complicated and duplicative firing electronics is required. An instantaneous firing of both transceivers is not required as long as tool movement in the time between the two transceiver measurements is relatively small.

The hole diameter is determined by adding the tool diameter to the standoffs as measured by the two opposed transceivers. A number of borehole diameter determinations are accumulated and averaged to produce a borehole measurement. Additional signal processing rejects false echoes caused by, for example, large cuttings in the drilling fluid by identifying formation echoes which occur after echoes from drilling cuttings in the drilling fluid. The signal processing also distinguishes formation echoes from its multiple arrivals, and from sensor noise.

An important aspect of the placement of acoustic transceivers 400 on the stabilizer blades 210' of the collar 20 is that such placement improves the accuracy of the tool standoff and borehole diameter measurements. The improvement in accuracy results from reducing the gap between the outer surface of the transceivers 400 and the borehole wall.

Knowledge of gamma ray attenuation caused by the drilling fluid existing between the gamma ray detectors and the formation wall is desirable for generating an improved formation gamma density determination which is compensated for standoff or cave effects. In making a drilling fluid attenuation correction to gamma ray detection data, the difference between formation density calculated from the far detector 310 and that calculated from the near detector 300 is generated. This difference is functionally related to an increment, which should be added to the density determined from the far detector. Such increment is a function of the standoff of the tool 20 from the borehole wall and to the gamma ray absorption property of the drilling fluid density being used and its photoelectric adsorption coefficient. Thus, knowledge of the density and the photoelectric adsorption coefficient of the drilling fluid in addition to the tool standoff is desirable to make an appropriate correction to the determined formation density.

In a similar manner, near and far detector data from radiation sensors 59, 60 of the neutron porosity section are affected by the amount of drilling fluid existing between such detectors and the formation wall. Measurement of borehole diameter by means of sensors 400 as described above provides the essential data in the determination of such volume of drilling fluid between the formation wall and the detectors.

Accordingly, near and far neutron porosity data from detectors 59, 60 and borehole diameter data from ultrasonic sensors 400 are collected in electronic cartridge 45 as a function of borehole depth or position. Such data may be stored and later retrieved when tool 20 is returned from the borehole to the well surface. Preferably, however, such data is transmitted to the surface via data signaling module 23 in the form of acoustic or pressure pulses via the drilling fluid within drill string 6. Such pulses are sensed by sensor 21 in standpipe 15 and the data is collected in surface instrumentation unit 7 of FIG. 1. To practice such data communication via drilling fluid, the data signalling cartridge illustrated in FIGS. 1 and 2 is preferably arranged similarly with the arrangement disclosed in U.S. Pat. No. 4,479,564 which is incorporated herein by reference.

Correction of data from near and far detectors 59 and 60 of the neutron porosity section 500 and of the near and far detectors 300, 310 of the gamma-gamma density section 600 by the standoff measurement derived from ultrasonic sensors 400 is either carried out after transmission of such data to surface instrumentation 7, or done downhole with suitable downhole instrumentation with the corrected data transmitted uphole or stored downhole.

Various modifications and alterations in the described methods and apparatus will be apparent to those skilled in the art of the foregoing description which does not depart from the spirit and scope of the invention. For this reason, these changes are desired to be included in the appended claims. The descriptive manner which is employed for setting forth the embodiments should be interpreted as illustrative but not limitative.

What is claimed is:

1. Apparatus for measuring characteristics of earth formations surrounding a borehole while drilling tool comprising:

a tubular body having upper and lower ends and adapted to be coupled to a drill string and adapted to provide a fluid flow path between its upper and lower ends, said tubular body having a nominal tubular outer radius, and having a source of neutrons disposed coaxially within said body;

a plurality of stabilizer blades secured symmetrically about the outer periphery of said tubular body, said blades having a maximum outer radius greater than said tubular outer radius, each of said blades having a longitudinal length and an angular width dimensions such that the angular width of each blade is substantially less than the angular distance between each blade;

a plurality of detector cavities in registration with each of said stabilizer blades, each of said cavities formed by an outwardly facing slot of said body which faces an inwardly facing slot of a stabilizer blade, said cavities characterized by an outer radial extend substantially greater than said nominal tubular outer radius, longitudinally spaced secondary radiation detectors associated with each of said cavities; and means responsive to said longitudinally spaced radiation detectors to generate first radiation signals useful for determining porosity of said earth formations.

2. The apparatus of claim 1 further comprising:

means including ultrasonic sensors carried by said body for measuring standoff of said body from said borehole, said measuring of standoff being performed while the borehole is being drilled, wherein said determining of porosity from said first radiation signals may be corrected as a function of measured standoff of said body.

3. The apparatus of claim 1 further comprising:

a gamma ray source positioned within said tubular body;

a second plurality of stabilizer blades disposed about the outer periphery of said tubular body, each of said second plurality of stabilizer blades extending radially outwardly from said tubular body at a second maximum radial distance;

at least one gamma ray detection assembly associated with at least one of said second plurality of stabilizer blades, each gamma ray detection assembly placed radially at least partially beyond said nominal outer radius of said tubular wall of said body in an associated gamma ray detection assembly cavity, said gamma ray detection assembly cavity extending radially into an associated blade; and means responsive to said at least one gamma ray detection assembly to generate second radiation signals useful for determining a second characteristic of said earth formations.

4. The apparatus of claim 3 further comprising:

means including ultrasonic sensors carried by said body for measuring standoff of said body from said borehole, said measuring of standoff being performed while the borehole is being drilled, wherein said determining of porosity from said first radiation signals may be corrected as a function of measured standoff of said body.

5. Apparatus for measuring characteristics of earth formations surrounding a borehole while drilling comprising:

a) a tubular body having upper and lower ends and adapted to be coupled to a drill string and adapted to provide a fluid flow path between its upper and lower ends, said tubular body having a tubular wall with a nominal outer radius and a fin section comprising a plurality of fins of increased outer radius;

b) a neutron source positioned within said tubular body, said source emitting high energy neutrons into the formation which produce secondary radiation as a result of neutron-formation interaction;

c) a first plurality of stabilizer blades disposed about the periphery of said tubular body, each one of said first plurality of stabilizer blades placed about one of said fins, said blades extending radially outwardly from said tubular body at a first maximum radial distance;

d) longitudinally spaced secondary radiation detectors associated with at least one of said fins and said first plurality of stabilizer blades, each secondary radiation detector placed radially at least partially beyond said increased outer radius of at least one of said fins in an associated secondary radiation detector cavity, said secondary radiation detector cavity extending radially into an associated blade;

e) means responsive to said longitudinally spaced secondary radiation detectors to generate first radiation signals useful for determining a first characteristic of said earth formations;

f) a gamma ray source positioned within said tubular body;

g) a second plurality of stabilizer blades disposed about the outer periphery of said tubular body, each of said second plurality of stabilizer blades extending radially outwardly from said tubular body at a second maximum radial distance;

h) at least one gamma ray detection assembly associated with at least one of said second plurality of stabilizer blades, each gamma ray detection assembly placed radially at least partially beyond said nominal outer radius of said tubular wall of said body in an associated gamma ray detection assembly cavity, said gamma ray detection assembly cavity extending radially into an associated blade; and i) means responsive to said at least one gamma ray detection assembly to generate second radiation signals useful for determining a second characteristic of said earth formations.

6. The apparatus of claim 5 wherein said first characteristic of said earth formations is porosity and wherein said second characteristic of said earth formations is density or photoelectric absorption coefficient.

7. The apparatus of claim 5 wherein said fins are defined by a longitudinal length and a peripheral width; and wherein each of said first and said second plurality of stabilizer blades includes an outer blade section that is secured to said tubular body and extends radially outwardly from said fins.

8. The apparatus of claim 7 wherein said outer blade section extends beyond each side of said peripheral width of said fins and extends beyond each end of said longitudinal length, whereby said outer blade section envelopes one of said fins.

9. The apparatus of claim 5 wherein said secondary radiation detector cavity is defined by a longitudinal outwardly facing slot in at least one of said plurality of fins and an inwardly facing slot in said outer blade section which is in registration with said outwardly facing slot.

10. The apparatus of claim 5 further comprising:

means for generating standoff signals indicative of the standoff of said at least one gamma ray detection assembly from said surrounding borehole, said means comprising at least one ultrasonic sensor disposed in at least one of said second plurality of stabilizer blades, said at least one ultrasonic sensor facing radially outwardly from said tubular body; and means for combining said second radiation signals and said standoff signals to correct said second earth formation characteristic.

11. Apparatus for measuring characteristics of earth formations surrounding a borehole while drilling comprising:

a) a tubular body having upper and lower ends and adapted to be coupled to a drill string and adapted to provide a fluid flow path between its upper and lower ends, said tubular body having a tubular wall with a nominal outer radius and a fin section comprising a plurality of fins of increased outer radius;

b) a neutron source positioned within said tubular body, said source emitting high energy neutrons into the formation which produce secondary radiation as a result of neutron-formation interaction;

c) a first plurality of stabilizer blades disposed about the periphery of said tubular body, each one of said first plurality of stabilizer blades placed about one of said fins, said blades extending radially outwardly from said tubular body at a first maximum radial distance, and a second plurality of stabilizer blades disposed about the periphery of said tubular body, said first and second sets of stabilizer blades being axially separated from each other;

d) longitudinally spaced secondary radiation detectors associated with at least one of said fins and said first plurality of stabilizer blades, each secondary radiation detector placed radially at least partially beyond said increased outer radius of at least one of said fins in an associated secondary radiation detector cavity, said secondary radiation detector cavity extending radially into an associated blade;

e) means responsive to said longitudinally spaced secondary radiation detectors to generate first radiation signals useful for determining a first characteristic of said earth formations;

f) means for generating borehole diameter signals indicative of the diameter of said borehole, said means comprising at least one ultrasonic sensor disposed in at least one of said second plurality of stabilizer blades, said at least one ultrasonic sensor facing radially outwardly from said tubular body; and g) means for combining said first radiation signals and said borehole diameter signals to correct said first earth formation characteristic.

12. Apparatus for measuring characteristics of earth formations surrounding a borehole while drilling comprising:

a) a tubular body having upper and lower ends and adapted to be coupled to a drill string and adapted to provide a flow path between its upper and lower ends, said tubular body having a tubular wall with a nominal outer radius and a fin section comprising a plurality of fins of increased outer radius;

b) a gamma ray source positioned within said tubular body;

c) a first plurality of stabilizer blades disposed about the outer periphery of said tubular body, each one of said stabilizer blades placed about each one of said plurality of fins, said blades extending radially outwardly from said tubular body at a maximum radial distance, at least one of said first plurality of stabilizer blades being designated as a gamma ray detection blade;

d) at least one gamma ray detection assembly placed radially at least partially beyond said increased outer radius of at least one of said fins in an associated gamma ray detection assembly cavity which extends radially into said gamma ray detection blade;

e) means responsive to said at least one gamma ray detection assembly to generate gamma ray signals useful for determining a first characteristic of said earth formations;

f) at least one ultrasonic sensor disposed in one of said first plurality of stabilizer blades, said at least one ultrasonic sensor facing radially outwardly from said tubular body; and g) means responsive to said at least one ultrasonic sensor for generating standoff signals indicative of the standoff between said at least one gamma ray detection assembly and said borehole.

13. The apparatus of claim 12 wherein said standoff signals are combined with said gamma ray signals to provide a correction to said first characteristic of said earth formations.

14. The apparatus of claim 12 wherein said stabilizer blade in which said at least one ultrasonic sensor is disposed is a blade other than said gamma ray detection blade.

15. Apparatus for measuring characteristics of earth formations surrounding a borehole while drilling comprising:

a) a tubular body having upper and lower ends and adapted to be coupled to a drill string and adapted to provide a flow path between its upper and lower ends, said tubular body having a tubular wall with a nominal outer radius and a fin section comprising a plurality of fins of increased outer radius;

b) a gamma ray source positioned within said tubular body;

c) a first plurality of stabilizer blades disposed about the outer periphery of said tubular body, each one of said stabilizer blades placed about each one of said plurality of fins, said blades extending radially outwardly from said tubular body at a maximum radial distance, at least one of said first plurality of stabilizer blades being designated as a gamma ray detection blade;

d) at least one gamma ray detection assembly placed radially at least partially beyond said increased outer radius of at least one of said fins in an associated gamma ray detection assembly cavity which extends radially into said gamma ray detection blade;

e) means responsive to said at least one gamma ray detection assembly to generate gamma ray signals useful for determining a first characteristic of said earth formations;

f) at least one ultrasonic sensor disposed in one of said first plurality of stabilizer blades, said at least one ultrasonic sensor facing radially outwardly from said tubular body;

g) means responsive to said at least one ultrasonic sensor for generating standoff signals indicative of the standoff between said at least one gamma ray detection assembly and said borehole, h) a neutron source positioned within said tubular body, said source emitting high energy neutrons into the formation which produce secondary radiation as a result of neutron-formation interaction;

i) a second plurality of stabilizer blades disposed about the periphery of said tubular body at a vertical distance separated from said first plurality of stabilizer blades, each of said second plurality of stabilizer blades extending radially outwardly from said tubular body;

j) at least one secondary radiation detector associated with at least one of said second plurality of stabilizer blades, each secondary radiation detector placed radially at least partially beyond said nominal outer radius of said tubular wall of said body in a secondary radiation detector cavity, said secondary radiation detector cavity extending radially into an associated stabilizer blade;

k) means responsive to said at least one secondary radiation detector to generate secondary radiation signals useful for determining a second characteristic of said earth formations; and l) means responsive to said at least one secondary radiation detector to generate secondary radiation signals useful for determining a second characteristic of said earth formations.

16. The apparatus of claim 15 further comprising;

means for generating borehole diameter signals from said at least one ultrasonic sensor indicative of the diameter of said borehole; and means for combining said borehole diameter signals and said secondary radiation signals to provide a correction to said second characteristic of said earth formations.

17. The apparatus of claim 15 further comprising:

means for generating standoff signals from said at least one ultrasonic sensor indicative of the standoff of said gamma ray detection assembly from said surrounding borehole, and means for generating borehole diameter signals from said at least one ultrasonic sensor indicative of the diameter of said borehole; and means for combining said standoff signals with said gamma ray signals to correct said first formation characteristic, and means for combining said borehole diameter signals with said secondary radiation signals to correct said second formation characteristic.

18. The apparatus of claim 17 wherein said standoff signals are combined with said gamma ray signals and said borehole diameter signals are combined with said secondary radiation signals in downhole instrumentation and wherein the corrected first and second formation characteristics are transmitted uphole.

* * * * *